United States Patent
Aki et al.

(10) Patent No.: US 11,242,024 B2
(45) Date of Patent: Feb. 8, 2022

(54) STRUCTURE OF SEAT EQUIPPED WITH FAR-SIDE AIRBAG DEVICE

(71) Applicant: TOYOTA JIDOSHA KABUSHIKI KAISHA, Toyota (JP)

(72) Inventors: Makoto Aki, Toyota (JP); Masato Kunisada, Susono (JP); Yoichiro Tanigawa, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 16/744,794

(22) Filed: Jan. 16, 2020

(65) Prior Publication Data
US 2020/0282939 A1 Sep. 10, 2020

(30) Foreign Application Priority Data
Mar. 6, 2019 (JP) .............................. JP2019-040962

(51) Int. Cl.
*B60R 21/207* (2006.01)
*B60R 21/231* (2011.01)
*B60N 2/42* (2006.01)

(52) U.S. Cl.
CPC .............. *B60R 21/207* (2013.01); *B60N 2/42* (2013.01); *B60R 21/23138* (2013.01); *B60R 2021/23146* (2013.01); *B60R 2021/23161* (2013.01)

(58) Field of Classification Search
CPC ............ B60R 21/207; B60R 21/23138; B60R 2021/23161; B60R 2021/23146; B60R 2021/23324; B60R 21/233; B60N 2/42
See application file for complete search history.

(56) References Cited

U.S. PATENT DOCUMENTS

| | | | |
|---|---|---|---|
| 10,131,312 B2 * | 11/2018 | Wiik | B60R 21/23138 |
| 10,407,015 B2 * | 9/2019 | Belwafa | B60R 21/23138 |
| 10,543,801 B2 * | 1/2020 | Kwon | B60R 21/2338 |
| 11,007,971 B2 * | 5/2021 | Rahman | B60R 21/23138 |
| 2012/0217731 A1 * | 8/2012 | Baba | B60R 21/233 280/730.2 |
| 2014/0151984 A1 * | 6/2014 | Fukawatase | B60R 21/23138 280/730.2 |

(Continued)

FOREIGN PATENT DOCUMENTS

| | | | | |
|---|---|---|---|---|
| CN | 111918795 A | * | 11/2020 | ............... B60N 2/64 |
| DE | 102014118721 A1 | * | 7/2015 | ........... B60R 21/207 |

(Continued)

*Primary Examiner* — Karen Beck
(74) *Attorney, Agent, or Firm* — Oliff PLC

(57) ABSTRACT

In a vehicle seat equipped with a far-side airbag device, an inner side frame is disposed inside a side part of a seat back that is a part on a center side in a vehicle width direction. An inflator, and a side airbag that inflates and deploys toward a vehicle front side when gas is supplied from the inflator housed inside, are mounted on an outer side in the vehicle width direction relative to the inner side frame. Here, a support part that extends farther toward the vehicle front side than a front end, in a vehicle front-rear direction, of an outer side frame provided inside a side part of the seat back that is a part on the outer side in the vehicle width direction, is disposed at a front end, in the vehicle front-rear direction, of the inner side frame.

4 Claims, 9 Drawing Sheets

(56) References Cited

U.S. PATENT DOCUMENTS

| | | | | |
|---|---|---|---|---|
| 2015/0158453 A1* | 6/2015 | Fujiwara | ............... | B60R 21/207 |
| | | | | 280/730.2 |
| 2015/0197209 A1* | 7/2015 | Fujiwara | ............... | B60R 21/231 |
| | | | | 280/730.1 |
| 2015/0375706 A1* | 12/2015 | Jaradi | ................... | B60R 21/207 |
| | | | | 280/730.1 |
| 2017/0253213 A1* | 9/2017 | Fujiwara | ............... | B60R 21/207 |
| 2018/0022308 A1* | 1/2018 | Kunisada | .......... | B60R 21/23138 |
| | | | | 280/730.2 |
| 2018/0222435 A1 | 8/2018 | Fukawatase et al. | | |
| 2019/0084516 A1* | 3/2019 | Fukawatase | ........ | B60R 21/2338 |
| 2021/0094499 A1* | 4/2021 | Deng | .................... | B60R 21/013 |

FOREIGN PATENT DOCUMENTS

| | | | | |
|---|---|---|---|---|
| DE | 102015117329 A1 * | 4/2016 | ....... | B60R 21/23138 |
| JP | 2018-12474 A * | 1/2018 | | |
| JP | 2018012474 A * | 1/2018 | | |
| JP | 2018012476 A * | 1/2018 | ....... | B60R 21/23138 |
| JP | 2018-122812 A | 8/2018 | | |
| JP | 2018122812 A * | 8/2018 | .......... | B60R 21/233 |
| JP | 2018127110 A * | 8/2018 | | |
| JP | 2020142659 A * | 9/2020 | .......... | B60R 21/233 |
| WO | WO-2017209192 A1 * | 12/2017 | ......... | B60R 21/2342 |

* cited by examiner

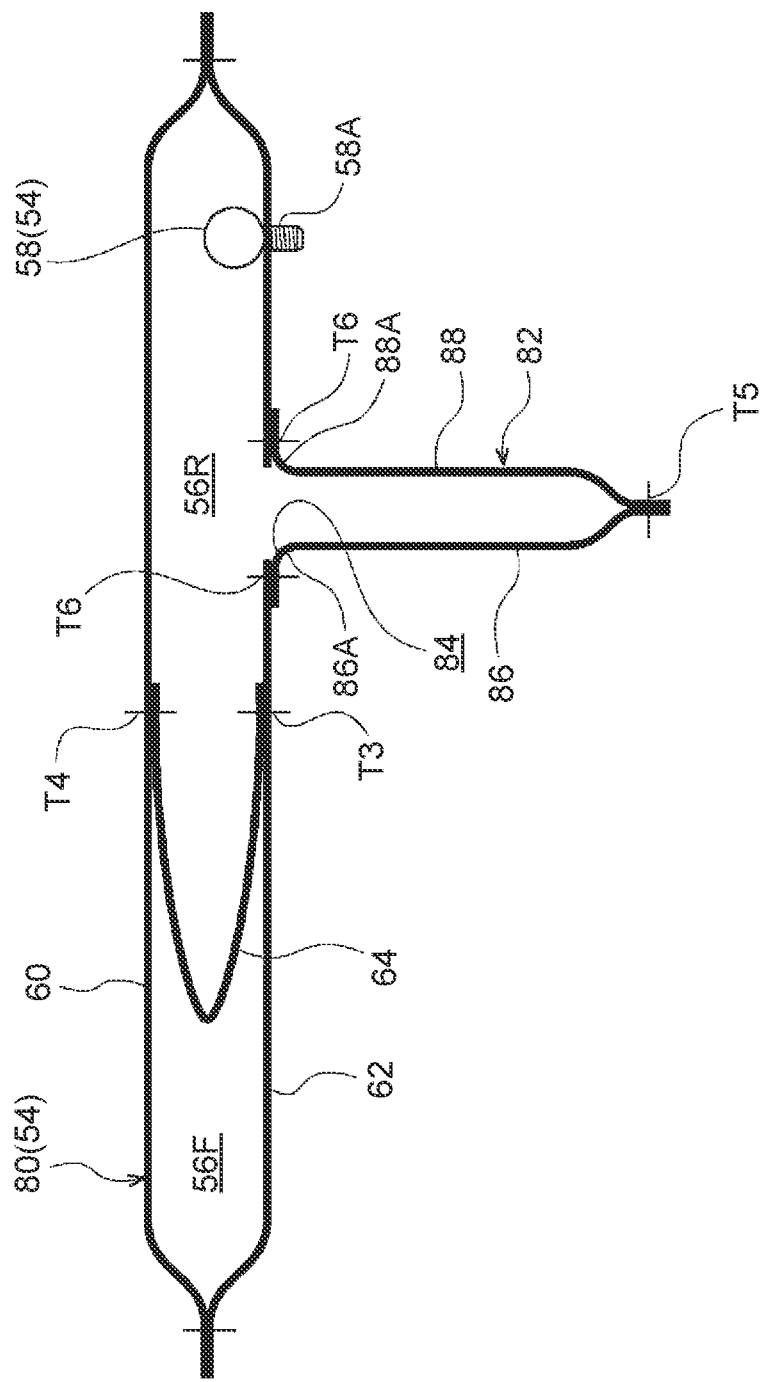

STRUCTURE OF SEAT EQUIPPED WITH FAR-SIDE AIRBAG DEVICE

INCORPORATION BY REFERENCE

The disclosure of Japanese Patent Application No. 2019-040962 filed on Mar. 6, 2019 including the specification, drawings and abstract is incorporated herein by reference in its entirety.

BACKGROUND

1. Technical Field

The present disclosure relates to a structure of a seat equipped with a far-side airbag device.

2. Description of Related Art

In the vehicle seat described in Japanese Patent Application Publication No. 2018-122812 (JP 2018-122812 A), a side airbag is disposed on a center side in a vehicle width direction relative to a side frame (outer side frame), inside a side part of a seat back that is a part on an outer side in the vehicle width direction. This side airbag is a so-called near-side airbag. It inflates and deploys toward a vehicle front side when gas is supplied from an inflator housed inside the side airbag, and can restrain a seated occupant by receiving a reaction force from the side frame and a side part of a vehicle cabin.

SUMMARY

It is conceivable to apply the technology described in JP 2018-122812 A to a far-side airbag and dispose the side airbag on an outer side in a vehicle width direction relative to a side frame (inner side frame), inside a side part of a seat back that is a part on a center side in the vehicle width direction. Also in this case, the side airbag, when inflating and deploying, can receive a reaction force from the side frame. However, a center side surface, in the vehicle width direction, of the side airbag cannot obtain a sufficient reaction force from a structure disposed at the center of a vehicle cabin, which may degrade the occupant restraining performance of the side airbag. This is where there is room for improvement in the related art.

In view of the above fact, the present disclosure aims to obtain a structure of a seat equipped with a far-side airbag device that can improve the occupant restraining performance of a side airbag.

A structure of a seat equipped with a far-side airbag device of the present disclosure according to claim 1 includes: an inflator that is mounted on an outer side, in a vehicle width direction, of a seat back relative to an inner side frame provided inside a side part of the seat back that is a part on a center side in the vehicle width direction; a side airbag that inflates and deploys toward a vehicle front side when gas is supplied from the inflator housed inside the side airbag; and a support part that is disposed at a front end, in a vehicle front-rear direction, of the inner side frame, and extends farther toward the vehicle front side than a front end, in the vehicle front-rear direction, of the inner frame that is inside a side part of the seat back that is a part on the outer side of the seat in the vehicle width direction.

In the structure of a seat equipped with a far-side airbag device of the present disclosure according to the first aspect, the inflator is mounted on the outer side, in the vehicle width direction, of the seat back relative to the inner side frame disposed inside the side part of the seat back that is the part on the center side in the vehicle width direction. This inflator is activated, for example, when a lateral collision of the vehicle is detected or foreseen. Then, the side airbag housing the inflator inside inflates and deploys toward the vehicle front side. The inflated and deployed side airbag quickly restrains a seated occupant by receiving a reaction force from the inner side frame.

Here, in the present disclosure, the support part is disposed at the front end, in the vehicle front-rear direction, of the inner side frame, and this support part extends farther toward the vehicle front side than the front end, in the vehicle front-rear direction, of the inner frame provided inside the side part of the seat back that is the part on the outer side of the seat in the vehicle width direction. Thus, the inflated and deployed side airbag can quickly receive a reaction force not only from the inner side frame but also from the support part. As a result, the occupant restraining performance of the airbag can be improved, even when, for example, a center side surface, in the vehicle width direction, of the side airbag cannot obtain a sufficient reaction force from a console box etc. disposed at the center of a vehicle cabin.

A structure of a seat equipped with a far-side airbag device of the present disclosure according to a second aspect has the configuration according to the first aspect, wherein, as seen in a plan view, the support part extends from the front end, in the vehicle front-rear direction, of the inner side frame toward a side that is the vehicle front side as well as the center side in the vehicle width direction.

In the structure of a seat equipped with a far-side airbag device of the present disclosure according to the second aspect, as seen in a plan view, the support part extends toward the side that is the vehicle front side as well as the center side in the vehicle width direction. This helps the side airbag deploy also toward the center side in the vehicle width direction when inflating toward the vehicle front side. Thus, the inflated and deployed side airbag can quickly receive a reaction force not only from the inner side frame and the support part but also from, for example, the console box disposed at the center of the vehicle cabin.

A structure of a seat equipped with a far-side airbag device of the present disclosure according to a third aspect has the configuration according to the first aspect or the second aspect, wherein the support part is disposed on the vehicle front side of the inflator, and is formed so as to be at least longer than the inflator toward a lower side in a vehicle up-down direction.

In the structure of a seat equipped with a far-side airbag device of the present disclosure according to the third aspect, the support part is disposed on the vehicle front side of the inflator, and is formed so as to be at least longer than the inflator toward the lower side in the vehicle up-down direction. Thus, a lower part of the inflated and deployed side airbag can restrain the occupant by receiving a sufficient reaction force from the support part. Therefore, for example, the waist of the occupant close to the center of gravity of the occupant can be quickly restrained by the side airbag to effectively improve the occupant restraining performance.

A structure of a seat equipped with a far-side airbag device of the present disclosure according to a fourth aspect has the configuration according to any one of the first to third aspects, wherein the support part is a front part, in the vehicle front-rear direction, of a support plate having a plate shape with a plate thickness direction oriented in the vehicle width direction, and the support plate is fixed to an outer side surface, in the vehicle width direction, of the inner side frame.

In the structure of a seat equipped with a far-side airbag device of the present disclosure according to the fourth aspect, the support plate is fixed to the outer side surface, in the vehicle width direction, of the inner side frame. The above-described support part is provided at the front part, in the vehicle front-rear direction, of the support plate. In this configuration, the rigidity of a fixed portion of the support part is enhanced as the inner side frame and the support plate are fixed together, so that the side airbag can receive an even greater reaction force from the support part.

A structure of a seat equipped with a far-side airbag device of the present disclosure according to a fifth aspect has the configuration according to the fourth aspect, wherein the support plate is secured to a front end, in the vehicle front-rear direction, of the inner side frame.

In the structure of a scat equipped with a far-side airbag device of the present disclosure according to the fifth aspect, the support plate is secured to the front end, in the vehicle front-rear direction, of the inner side frame. This makes it easy to position the support plate when installing the support plate onto the inner side frame, allowing for high installation work efficiency. The portion of the support plate that comes into contact with the front end of the inner side frame is a portion at which a load input from the inflated and deployed side airbag concentrates. Thus, this configuration strengthens the bond between the support plate and the front end of the inner side frame, thereby contributing to increasing the reaction force that the side airbag receives from the support part.

A structure of a scat equipped with a far-side airbag device of the present disclosure according to a sixth aspect has the configuration according to the fifth aspect, wherein the support plate is secured as a protrusion that extends in a vehicle up-down direction and protrudes toward the center side in the vehicle width direction is engaged in a recessed groove formed at the front end of the inner side frame.

In the structure of a seat equipped with a far-side airbag device of the present disclosure according to the sixth aspect, the support plate is secured to the inner side frame, from an upper part to a lower part of the support plate in the vehicle up-down direction, as the protrusion of the support plate is engaged in the recessed groove of the inner side frame. Thus, the reaction force received from the support part can be increased over a wide area of the inflated and deployed side airbag in the vehicle up-down direction.

A structure of a seat equipped with a far-side airbag device of the present disclosure according to a seventh aspect has the configuration according to any one of the first to sixth aspects, wherein an additional chamber that inflates and deploys toward the center side in the vehicle width direction and a vehicle rear side when gas is supplied from the inflator into the additional chamber, is provided on a surface of the side airbag that is a center side surface in the vehicle width direction in an inflated and deployed state of the side airbag.

In the structure of a seat equipped with a far-side airbag device of the present disclosure according to the seventh aspect, when the inflator is activated, the side airbag inflates and deploys toward the vehicle front side. Further, the additional chamber inflates and deploys toward the center side in the vehicle width direction and the vehicle rear side so as to straddle the inner side frame in the vehicle width direction. Thus, the additional chamber gets caught on the support plate and can thereby reduce swinging of the side airbag. As a result, the additional chamber contributes to stabilizing the deploying behavior of the side airbag.

As has been described above, the structure of a seat equipped with a far-side airbag device according to the first aspect has an excellent advantage in that the occupant restraining performance of the side airbag can be improved.

The structure of a seat equipped with a far-side airbag device according to the second aspect has an excellent advantage in that a reaction force surface for the side airbag can be effectively secured to further improve the occupant restraining performance.

The structure of a seat equipped with a far-side airbag device according to the third aspect has an excellent advantage in that the waist etc. of an occupant close to the center of gravity of the occupant can be quickly restrained by the side airbag.

The structure of a seat equipped with a far-side airbag device according to the fourth aspect has an excellent advantage in that the rigidity of the support part can be enhanced to further increase the reaction force that the side airbag receives from the support part.

The structure of a seat equipped with a far-side airbag device according to the fifth aspect has an excellent advantage in that the bond between the inner side frame and the support plate can be strengthened to further increase the reaction force that the side airbag receives from the support part.

The structure of a seat equipped with a far-side airbag device according to the sixth aspect has an excellent advantage in that the reaction force received from the support part can be increased over a wide area of the inflated and deployed side airbag in the vehicle up-down direction.

The structure of a seat equipped with a far-side airbag device according to the seventh aspect has an excellent advantage in that it contributes to stabilizing the deploying behavior of the side airbag.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 9 is a sectional plan view showing a state where the side airbag according to the second embodiment is not inflated and deployed.

DETAILED DESCRIPTION OF EMBODIMENTS

First Embodiment

Figure 1:
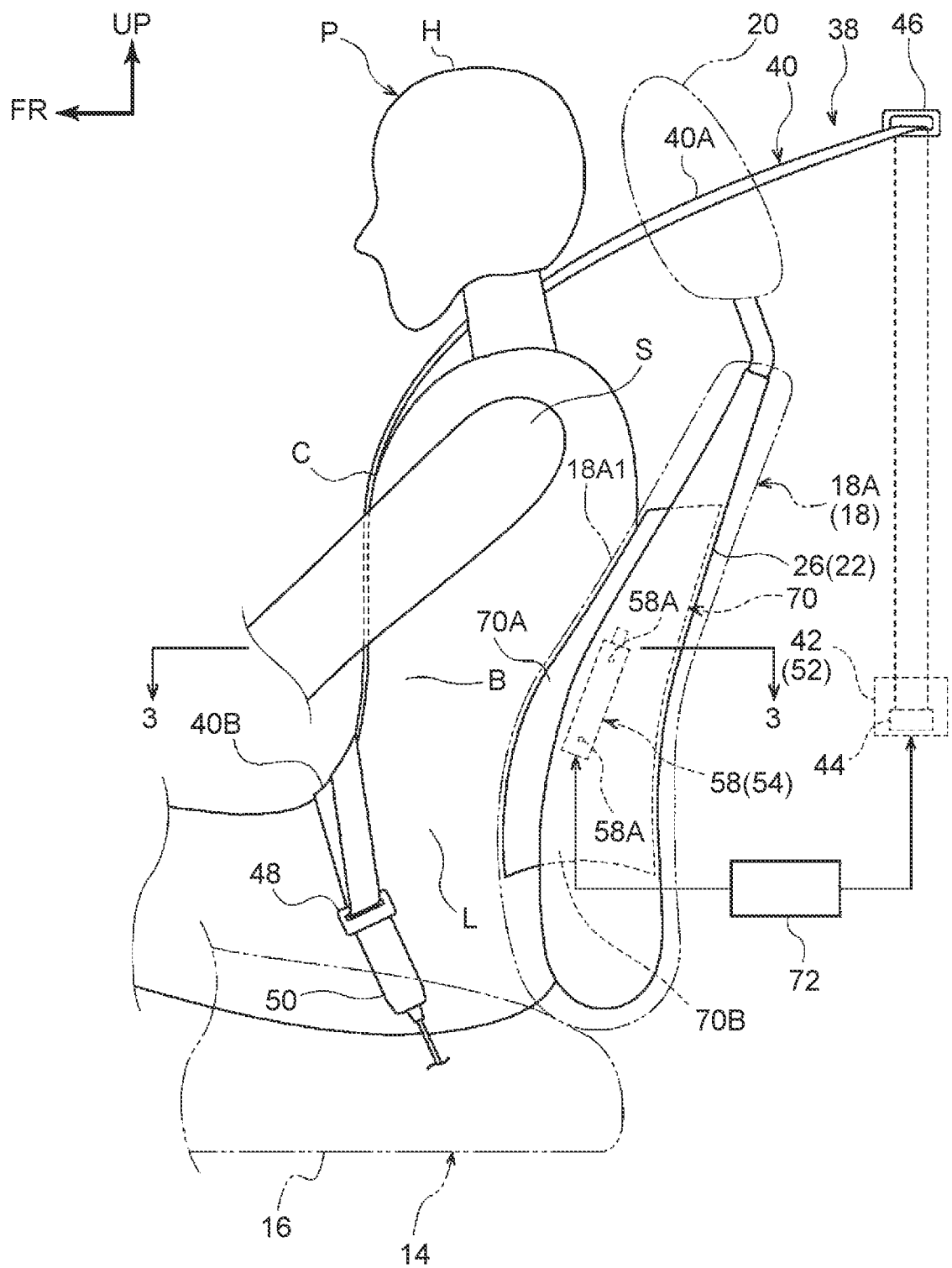
FIG. 1 is a side view, as seen from a center side in a vehicle width direction, of a vehicle scat equipped with a far-side airbag device according to a first embodiment.

A vehicle seat 14 equipped with a far-side airbag device 54 according to a first embodiment will be described below using FIG. 1 to FIG. 6. The arrows FR, UP, and RH shown in the drawings as necessary indicate a vehicle front side, vehicle upper side, and vehicle right side, respectively. Unless otherwise noted, front and rear sides, upper and lower sides, and left and right sides used in the following description mean front and rear sides in a vehicle front-rear direction, upper and lower sides in a vehicle up-down direction, and left and right sides as seen in an advancing direction.

Vehicle Seat 14

As shown in FIG. 1, the vehicle seat 14 includes a seat cushion 16 on which an occupant sits, a seat back 18 supported on a rear end of the seat cushion 16 so as to be reclinable, and a headrest 20 coupled to an upper end of the seat hack 18. The vehicle seat 14 is, for example, a front passenger seat of a left-hand-drive vehicle.

The far-side airbag device 54 (hereinafter also referred to as an "FS airbag device 54") to be described later is installed on a side support part 18A (a side part; hereinafter referred to as a "side part 18A") constituting a side part of the seat back 18 of the vehicle seat 14 that is a part on a center side in a vehicle width direction.

A front-rear direction, left-right direction (width direction), and up-down direction of the vehicle seat 14 coincide with the front-rear direction, left-right direction (width direction), and up-down direction of the vehicle. In FIG. 1, FIG. 2, FIG. 5, and FIG. 6, a crash test dummy P, instead of an actual occupant, is seated on the vehicle seat 14. This dummy P is, for example, AM50 (50th percentile American adult male) of World Side Impact Dummy (WorldSID). To make the following description easy to understand, the dummy P will be referred to as an "occupant P."

As shown in FIG. 3 to FIG. 6, the seat back 18 includes a seat back frame 22 constituting a frame of the seat back 18, a seat back pad 28 put over the seat back frame 22, and a seat back skin 30 covering the seat back pad 28. The seat back pad 28 and the seat hack skin 30 are not shown in the other drawings than FIG. 3.

The seat back frame 22 is made of metal, for example, and includes an outer side frame 24 that extends in an up-down direction of the seat back 18 inside a side part 18A of the seat back 18 that is a part on the outer side in the vehicle width direction, and an inner side frame 26 that extends in the up-down direction of the scat hack 18 inside the side part 18A of the scat back 18 that is the part on the center side in the vehicle width direction. The scat back frame 22 further includes an upper frame (not shown) that connects upper ends of the outer side frame 24 and the inner side frame 26 to each other in the vehicle width direction, and a lower frame (not shown) that connects lower ends of the outer side frame 24 and the inner side frame 26 to each other in the vehicle width direction.

Figure 3:
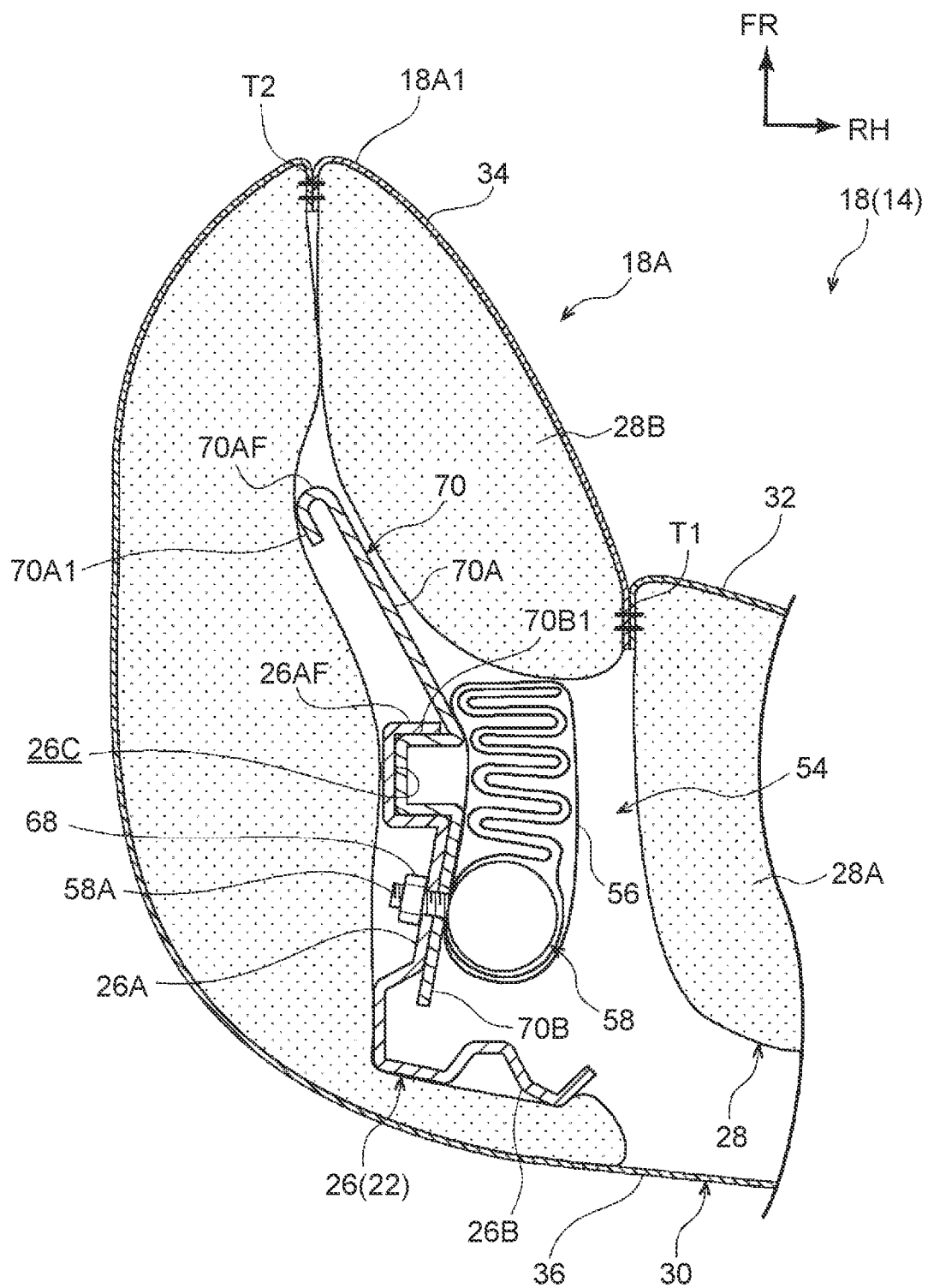
FIG. 3 is a sectional view schematically showing a section along line 3-3 of FIG. 1.

As shown in FIG. 3, the inner side frame 26 includes a side wall 26A extending in the vehicle front-rear direction as seen in a sectional plan view of the seat back 18, and a rear flange 26B extending from a rear end of the side wall 26A toward the outer side in the vehicle width direction, and has a substantially L-shapc as seen in a sectional plan view. At a front end of the side wall 26A, a recessed groove 26C recessed toward the center side in the vehicle width direction is formed along a front edge 26AF of the side wall 26A. The outer side frame 24 is formed symmetrically with the inner side frame 26 in the left-right direction (see FIG. 5 and FIG. 6).

The seat back pad 28 is put over the seat back frame 22 configured as described above. The seat back pad 28 is formed by a foam, such as a urethane foam, and constitutes a cushion material of the seat back 18. The seat back pad 28 integrally includes a pad center part 28A disposed at a center part, in the width direction, of the seat back 18, and a pair of left and right pad side parts 28B provided on left and right sides of the pad center part 28A. The left and right pad side parts 28B have a substantially C-shape opening toward an inner side, in the width direction, of the seat back 18 and house the outer side frame 24 and the inner side frame 26 inside.

A surface of the seat back pad 28 is covered with the seat back skin 30 made of a fabric material, leather, synthetic leather, etc. The seat back skin 30 includes a front skin 32 covering the pad center part 28A from a seat front side, front side skins 34 covering the pad side parts 28B from the seat front side, and a rear side skin 36 covering the pad side parts 28B from outer sides in the seat width direction and the seat rear side and covering the pad center part 28A from the seat rear side. Each front side skin 34 is sewn to the front skin 32 along a seam T1 and sewn to the rear side skin 36 along a seam T2. The seam T2 between the front side skin 34 and the rear side skin 36 is located near a front edge 18A1 of the side part 18A. The seam T2 is configured to be torn open along with the pad side part 28B when a side airbag 56 to be described later inflates and deploys.

On the other hand, as shown in FIG. 1, the vehicle seat 14 is equipped with a seatbelt device 38. The seatbelt device 38 is a so-called three-point seatbelt device, and includes a webbing 40 that restrains the occupant P seated on the vehicle seat 14 onto the vehicle seat 14.

The webbing 40 has a long band shape, and one end of the webbing 40 is secured to a winding shaft 44 of a retractor 42. The retractor 42 is fixed to a lower end of a B-pillar (not shown) constituting a part of a side wall of a vehicle cabin. An intermediate portion of the webbing 40 is wound and hung on a shoulder anchor (slip joint) 46 mounted on an upper portion of the B-pillar, while the other end of the webbing 40 is secured to a floor (not shown) of the vehicle, near the lower end of the B-pillar, or to an anchor member fixed to a seat cushion frame (not shown).

A tongue plate 48 is slidably mounted on an intermediate portion of the webbing 40, between the shoulder anchor 46 and the anchor member. The tongue plate 48 is coupled to a buckle 50 provided at a center-side portion, in the vehicle width direction, of the vehicle seat 14. Coupling the tongue plate 48 to the buckle 50 creates a webbing-restrained state in which the occupant P seated on the vehicle seat 14 is restrained by the webbing 40. In this state, a portion of the webbing 40 between the tongue plate 48 and the shoulder anchor 46 serves as a shoulder webbing 40A that restrains the upper body of the occupant P, while a portion of the webbing 40 between the tongue plate 48 and the anchor member serves as a lap webbing 40B that restrains the waist L of the occupant P.

The retractor 42 is a webbing winding device that retracts the webbing 40 by winding the webbing 40 on the winding shaft 44 so as to allow the webbing 40 to be pulled out, and is housed at a lower end of an inside of the B-pillar. The retractor 42 is configured to restrict pulling out of the webbing 40 by locking the rotation of the winding shaft 44 when the vehicle decelerates suddenly. The retractor 42 has a pretensioner 52. The pretensioner 52 is of a pyrotechnic type, and is configured to rotate the winding shaft 44 by ignition of explosives and thereby forcibly wind the webbing 40 on the winding shaft 44. However, the pretensioner 52 is not limited to a pyrotechnic type and may instead be of an electrically operated type. In this case, the pretensioner 52 is configured to rotate the winding shaft 44 by driving of a motor and thereby forcibly wind the webbing 40 on the winding shaft 44. Since the pretensioner 52 is a conventionally known one, a detailed description thereof will be omitted.

Far-Side Airbag Device 54

Figure 2:
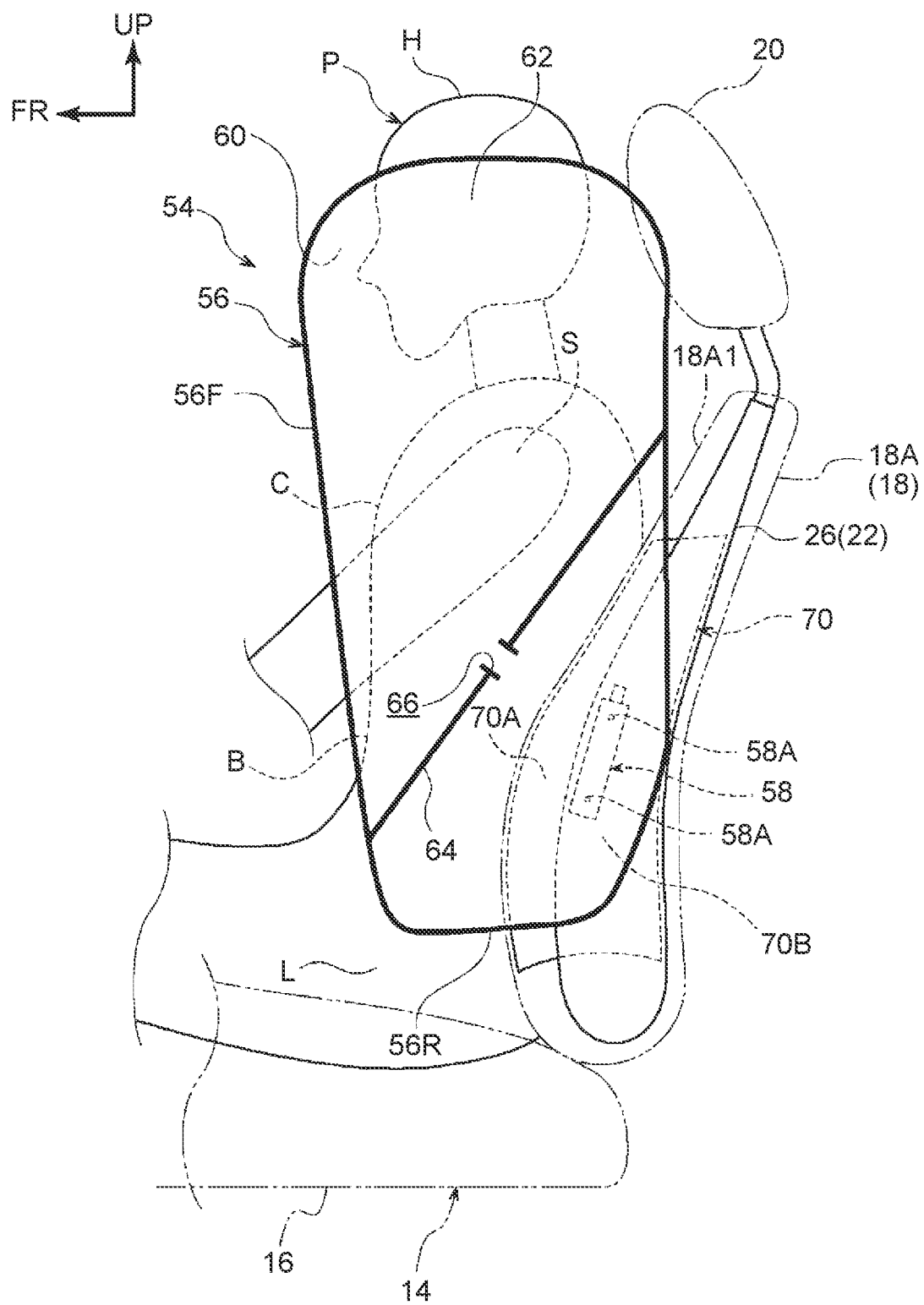
FIG. 2 is a side view corresponding to FIG. 1, showing an inflated and deployed state of a far-side airbag.

As shown in FIG. 2 and FIG. 3, the FS airbag device 54 includes the side airbag 56 and an inflator 58. At normal times, the side airbag 56 and the inflator 58 are housed inside the side part 18A as a module. Front, rear, upper, and lower sides used in the following description with respect to the side airbag 56 mean those sides of the side airbag 56 as a member, and substantially coincide with the front, rear, upper, and lower sides of the seat back 18 in an inflated and deployed state of the side airbag 56.

The side airbag 56 is formed by cutting out one sheet of base fabric from a nylon or polyester fabric material, for example, folding the base fabric in half, and sewing together the halves along outer peripheral edges so as to form a bag. Hereinafter, a portion of the base fabric folded in half that is disposed on the inner side in the seat width direction and a portion thereof disposed on the outer side in the seat width direction, in an inflated and deployed state of the side airbag 56, will be referred to as an inner base fabric 60 and an outer base fabric 62, respectively (see FIG. 2 and FIG. 6).

The manufacturing method of the side airbag 56 is not limited to the above example, and the side airbag 56 may instead be formed by placing two sheets of base fabric one on top of the other and sewing them together along outer peripheral edges.

The side airbag 56 is formed so as to have a substantially oval shape elongated in the up-down direction of the seat back 18 when seen from a lateral side in an inflated and deployed state. The size of the side airbag 56 is set to such a size that the side airbag 56 can restrain (protect) the head H, shoulder S, chest C, belly B, and waist L of the occupant P seated on the vehicle seat 14.

The side airbag 56 here is a so-called two-chamber side airbag, and is divided by a front-rear partition 64 into a front chamber 56F and a rear chamber 56R. The front-rear partition 64 is formed by a tether (partition wall) mounted inside the side airbag 56. The front chamber 56F and the rear chamber 56R communicate with each other through a plurality of communication openings 66 (inner vent holes) formed in the front-rear partition 64.

Figure 6:
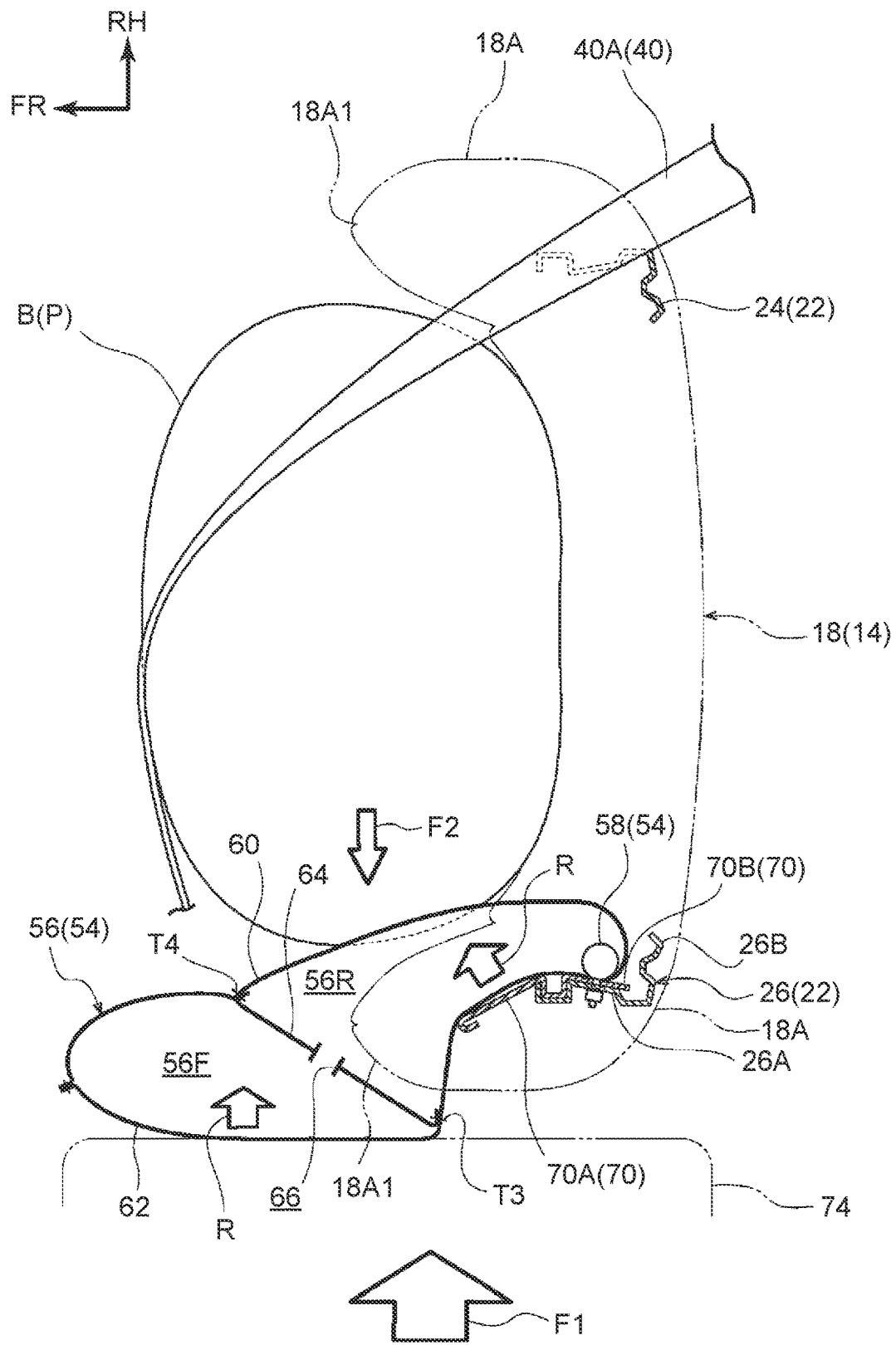
FIG. 6 is a schematic plan view of the vehicle seat shown in FIG. 1, illustrating how the occupant is restrained by the pretensioner and the side airbag.

The front-rear partition 64 is formed, for example, by cutting out a long band from the same fabric material as the outer base fabric 62 and the inner base fabric 60. As shown in FIG. 6, one of long-side edges of the front-rear partition 64 is sewn to the outer base fabric 62 along a seam T3, while the other long-side edge is sewn to the inner base fabric 60 along a seam T4.

As shown in FIG. 2 and FIG. 3, the inflator 58 is housed at a lower part of a rear end of the side airbag 56 along with a retainer (not shown). In this state, the inflator 58 is provided on the outer side, in the seat width direction, of the side wall 26A of the inner side frame 26 (the outer side, in the vehicle width direction, of the seat back 18 relative to the inner side frame 26), on the seat front side of the rear flange 26B. The inflator 58 is a so-called cylinder inflator and has a cylindrical shape. The inflator 58 is disposed in such a posture that an axial direction (longitudinal direction) thereof is oriented in the up-down direction of the seat back 18. The retainer is made of metal and has a substantially rectangular tubular shape, and houses the inflator 58 inside. The retainer functions to regulate the flow of gas generated from the inflator 58.

The inflator 58 is fixed to the inner side frame 26 along with a support plate 70 that applies a deployment reaction force when the side airbag 56 deploys. More specifically, a pair of upper and lower stud bolts 58A protrudes from an outer periphery of the inflator 58 toward the center side in the vehicle width direction. The upper and lower stud bolts 58A are passed through the retainer, the outer base fabric 62 of the side airbag 56, the support plate 70, and the inner side frame 26, and nuts 68 are engaged on leading ends of the stud bolts 58A. Thus, the inflator 58 is fastened and fixed (by so-called side surface fastening) to the inner side frame 26 along with the side airbag 56, the retainer, and the support plate 70. The support plate 70 will be described in detail later.

Main Part of Present Disclosure

As shown in FIG. 1 to FIG. 6, in this embodiment, the support plate 70 is provided between a lower part of the rear end of the side airbag 56 and an outer side surface, in the vehicle width direction, of the inner side frame 26. The support plate 70 has a long plate shape as a whole, and is disposed in such a posture that a longitudinal direction and a plate thickness direction thereof are oriented in the up-down direction of the seat back 18 and in the vehicle width direction, respectively. For example, an aluminum alloy, a steel plate, or a carbon-fiber plastic can be used as the material of the support plate 70.

As shown in FIG. 3, a support part 70A is provided at a front part, in the vehicle front-rear direction, of the support plate 70. As seen in a plan view, the support part 70A extends from a front end, in the vehicle front-rear direction, of the inner side frame 26 (a front edge 26AF of the side wall 26A) toward a side that is the vehicle front side as well as the center side in the vehicle width direction. As described above, the outer side frame 24 is formed symmetrically with the inner side frame 26. Therefore, it can also be said that, as seen in a plan view, the support part 70A is disposed at the front end of the inner side frame 26 and extends farther toward the vehicle front side than a front end, in the vehicle front-rear direction, of the outer side frame 24. As seen in a side view, a front edge 70AF of the support part 70A is formed along the outline of the front edge 26AF of the side wall 26A. At a front end (front edge 70AF), in the vehicle front-rear direction, of the support part 70A, a turn-back flange 70A1 that is turned back from the front end toward the center side in the vehicle width direction is formed. The turn-back flange 70A1 functions to prevent a leading end of the support plate 70 from getting caught on the base fabric of the side airbag 56 and tearing the base fabric during inflation and deployment of the side airbag 56.

On the other hand, a fixed part 70B is provided at a rear part, in the vehicle front-rear direction, of the support plate 70. The fixed part 70B is disposed along an outer side surface, in the vehicle width direction, of the inner side frame 26. The fixed part 70B has a protrusion 70B1 protruding toward the center side in the vehicle width direction that is formed by bending the fixed part 70B into a shape of a groove extending in the vehicle up-down direction. The protrusion 70B1 corresponds to the recessed groove 26C formed at the front end, in the vehicle front-rear direction, of the side wall 26A and is engaged in the recessed groove 26C. Thus, the support plate 70 is secured to the front end, in the vehicle front-rear direction, of the inner side frame. The stud bolts 58A of the inflator 58 are passed through a rear end of the fixed part 70B, and the rear end is fixed to the side wall 26A of the inner side frame 26.

Figure 4:
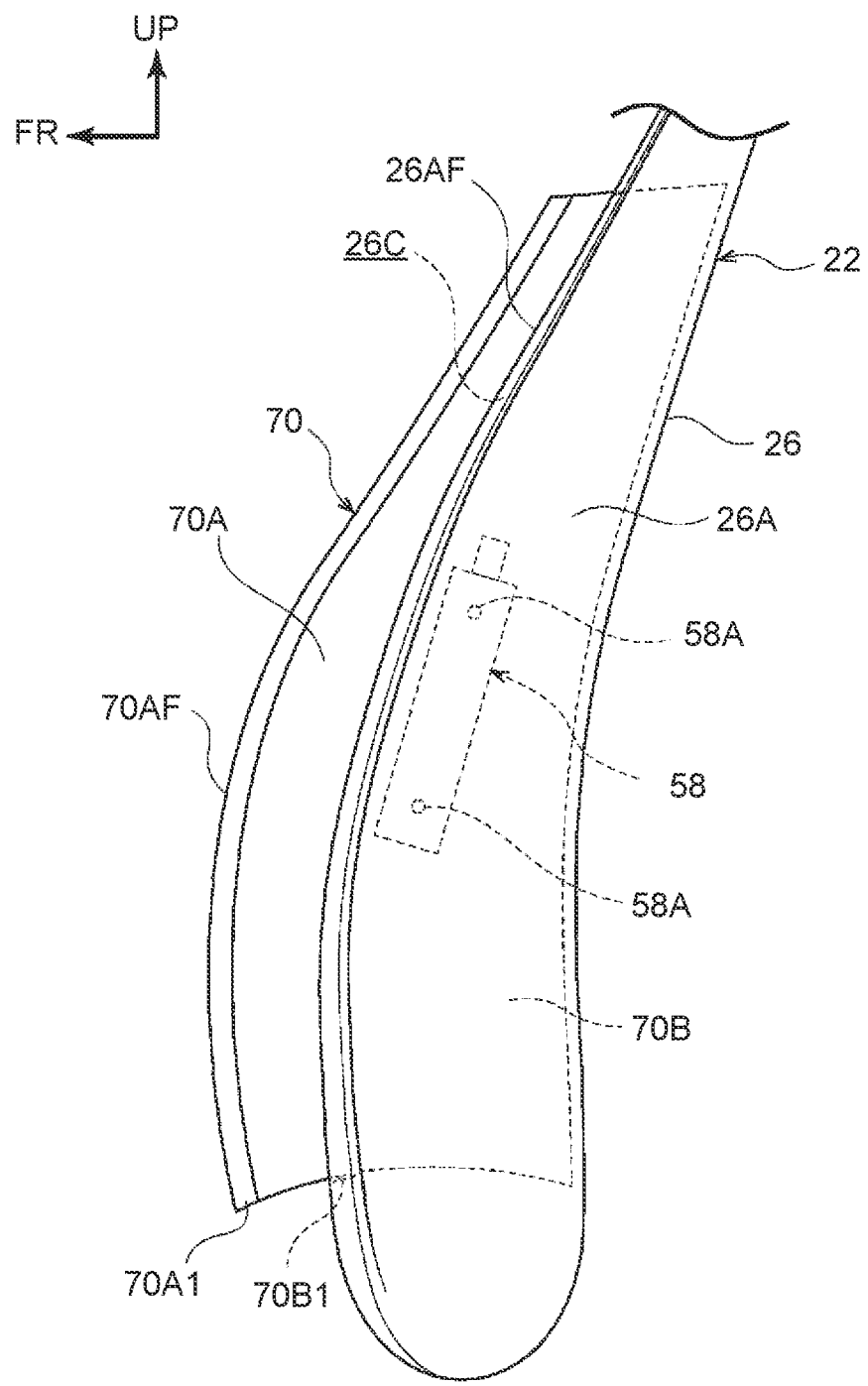
FIG. 4 is a side view of an inner side frame and a support plate shown in FIG. 1.

As shown in FIG. 2 and FIG. 4, an upper-side part of the support plate 70 is formed such that the dimension in the vehicle front-rear direction decreases toward an upper end. The dimension of the support plate 70 (support part 70A) in the up-down direction is larger than the dimension of the inflator 58 in the longitudinal direction. The support part 70A is disposed along the front end of the inner side frame 26, from an upper part to a lower part of the front end. Thus, the support part 70A is formed so as to be longer than the inflator 58 toward both sides in the vehicle up-down direction, so that a deployment reaction force is applied from the support part 70A not only to a center part of the side airbag 56 but also to an upper part and a lower part of the side airbag 56 that inflate and deploy on the upper and lower sides of the inflator 58.

In the vehicle seat 14 having been described above, a lateral collision electrical control unit (ECU) 72 installed in the vehicle is electrically connected to the pretensioner 52 of the seatbelt device 38 and the inflator 58 of the FS airbag device 54. A lateral collision sensor (not shown) that detects a lateral collision is electrically connected to the lateral collision ECU 72, and the lateral collision ECU 72 and the lateral collision sensor constitute a controller that controls the pretensioner 52 and the FS airbag device 54. The lateral collision ECU 72 is configured to trigger (activate) the pretensioner 52 and the inflator 58 upon detecting a lateral collision based on a signal from the lateral collision sensor. In the case where a pre-crash sensor that foresees (predicts) a lateral collision is electrically connected to the lateral collision ECU 72, the pretensioner 52 and the inflator 58 may be triggered when the lateral collision ECU 72 foresees a lateral collision based on a signal from the pre-crash sensor.

Here, the occupant restraining performance of the vehicle seat 14 in a lateral collision when a collision load F1 has been input into a left side surface of the vehicle will be described using FIG. 5 and FIG. 6. In this case, the occupant P seated on the vehicle seat 14 tries to move toward the center side in the vehicle width direction by inertia due to the collision (see the direction indicated by arrow F2 in FIG. 6).

Figure 5:
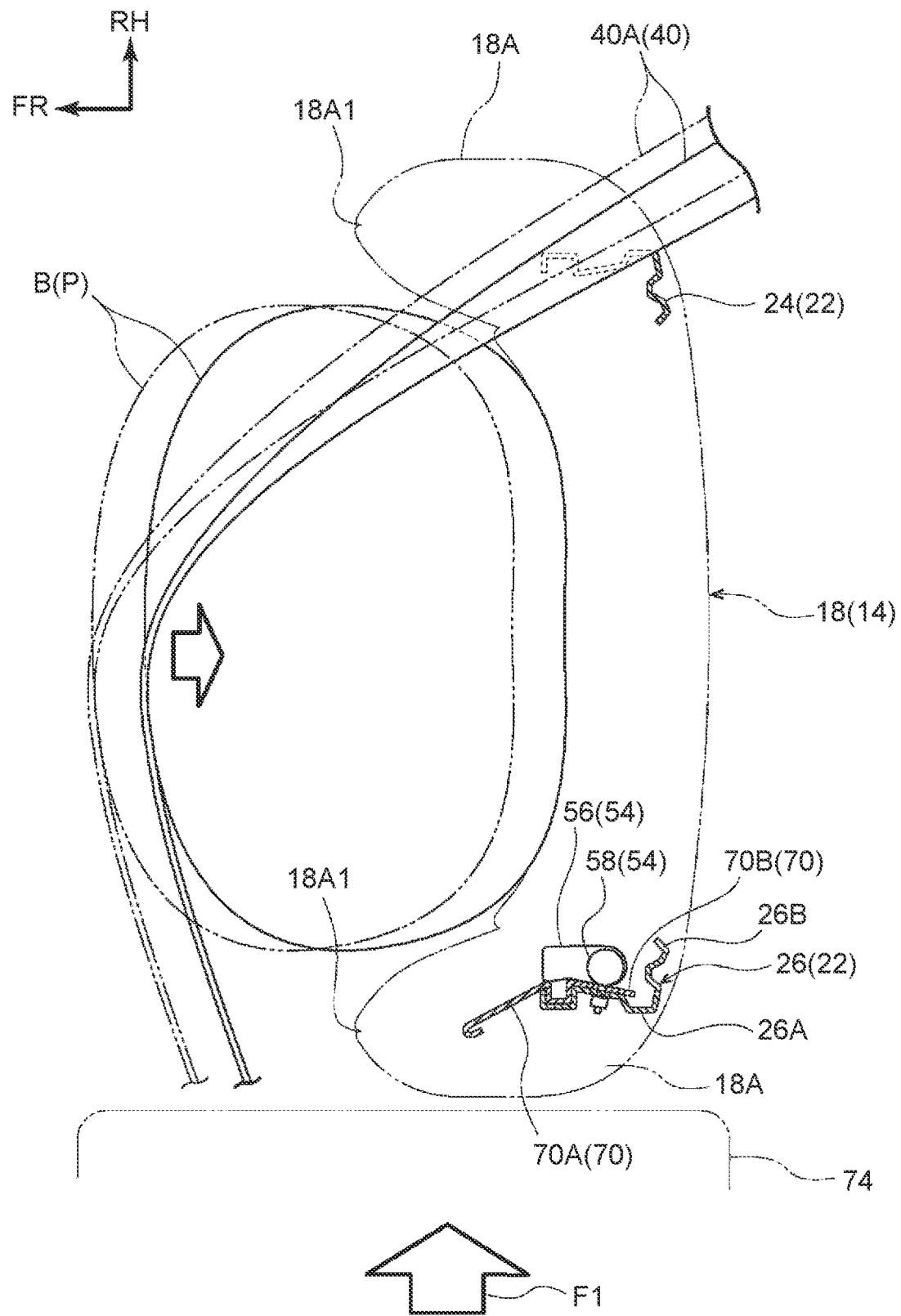
FIG. 5 is a schematic plan view of the vehicle seat shown in FIG. 1, illustrating how an occupant is restrained by a pretensioner.

As shown in FIG. 5, when the pretensioner 52 and the inflator 58 are activated, first, the webbing 40 is wound on the winding shaft 44 of the retractor 42 by the pretensioner 52. Thus, the shoulder webbing 40A moves from the position of the long dashed double-short dashed line to the position of the solid line in FIG. 5, thereby restraining the belly B and the shoulder S located on the outer side in the vehicle width direction of the occupant P into close contact with the seat back 18.

Next, gas generated from the inflator 58 is injected (supplied) into the rear chamber 56R through the retainer (not shown). Thus, the rear chamber 56R starts to inflate and deploy early. Part of the gas supplied into the rear chamber 56R is supplied to the front chamber 56F through the communication openings 66 formed in the front-rear partition 64. Then, the front chamber 56F starts to inflate and deploy later than the rear chamber 56R. Thus, the side airbag 56 inflates and deploys toward the vehicle front side and the center side in the vehicle width direction by the pressure of the gas generated from the inflator 58, so as to be disposed between the occupant P and a console box 74 (see FIG. 5 and FIG. 6) provided at the center of a front chamber of the vehicle. As a result, the occupant P is restrained by the side airbag 56 to which a reaction force R (see FIG. 6) has been applied from the inner side frame 26, the support part 70A, and the console box 74.

Workings and Effects

Next, the workings and effects of the first embodiment will be described.

In the vehicle seat 14 of this embodiment, the inflator 58 is mounted on the outer side, in the vehicle width direction, of the inner side frame 26 provided inside the side part 18A of the seat back 18 that is the part on the center side in the vehicle width direction. When the inflator 58 is activated, the side airbag 56 housing the inflator 58 inside inflates and deploys toward the vehicle front side. The inflated and deployed side airbag 56 quickly restrains the occupant P by receiving a reaction force from the inner side frame 26.

Here, in this embodiment, the support part 70A of the support plate 70 is disposed at the front end, in the vehicle front-rear direction, of the inner side frame 26, and the support part 70A extends farther toward the vehicle front side than the front end, in the vehicle front-rear direction, of the outer side frame 24 of the seat back 18. Thus, the inflated and deployed side airbag 56 can quickly receive a reaction force not only from the inner side frame 26 but also from the support part 70A. As a result, the performance of the side airbag 56 in restraining the occupant P can be improved, for example, even when the center side surface, in the vehicle width direction, of the side airbag 56 cannot obtain a sufficient reaction force from the console box 74 etc.

In this embodiment, as seen in a plan view, the support part 70A extends toward the side that is the vehicle front side as well as the center side in the vehicle width direction, which helps the side airbag 56 deploy also toward the center side in the vehicle width direction when inflating toward the vehicle front side. Thus, the inflated and deployed side airbag 56 can quickly receive a reaction force not only from the inner side frame 26 and the support part 70A but also from the console box 74.

In this embodiment, the support part 70A is disposed on the vehicle front side of the inflator 58 and formed so as to be longer than the inflator 58 toward both sides in the vehicle up-down direction. Here, the portion of the support part 70A that is formed so as to be longer than the inflator 58 toward the lower side allows the lower part of the inflated and deployed side airbag 56 to restrain the occupant P by receiving a sufficient reaction force from the support part 70A. Thus, for example, the waist L of the occupant P close to the center of gravity of the occupant P can be quickly restrained by the side airbag 56 to effectively improve the performance of restraining the occupant P.

On the other hand, the portion of the support part 70A that is formed so as to be longer than the inflator 58 toward the upper side allows the upper part of the side airbag 56 for which a reaction force surface is normally hard to secure, to restrain the occupant P by receiving a sufficient reaction force from the support part 70A. Thus, for example, the performance of restraining the shoulder S and the head H of the occupant P can be improved.

In this embodiment, the support part 70A that applies a reaction force to the side airbag 56 is provided at the front part, in the vehicle front-rear direction, of the support plate 70 that is separate from the inner side frame 26 and fixed to the outer side surface, in the vehicle width direction, of the inner side frame 26. In this configuration, the rigidity of the fixed portion of the support plate 70 is enhanced as the support plate 70 is fixed to the inner side frame 26, so that the reaction force that the side airbag 56 receives from the support part 70A can be further increased.

In this embodiment, the support plate 70 is secured to the front end, in the vehicle front-rear direction, of the inner side frame 26. Specifically, the support plate 70 is secured as the protrusion 70B1 formed in the support plate 70 is engaged in the recessed groove 26C of the inner side frame 26. This makes it easy to position the support plate 70 when installing the support plate 70 onto the inner side frame 26, allowing for high installation work efficiency. The portion of the support plate 70 that comes into contact with the front end of the inner side frame 26 is a portion at which a load input from the inflated and deployed side airbag 56 concentrates. Thus, this configuration strengthens the bond between the support plate 70 and the front end of the inner side frame 26, thereby contributing to increasing the reaction force that the side airbag 56 receives from the support part 70A.

In this embodiment, the protrusion 70B1 and the recessed groove 26C are shaped so as to extend in the vehicle up-down direction along the support plate 70 and the inner side frame 26. Thus, the support plate 70 is secured to the inner side frame 26, from the upper part to the lower part of the support plate 70 in the vehicle up-down direction. As a result, the reaction force received from the support part 70A can be enhanced over a wide area of the inflated and deployed side airbag 56 in the vehicle up-down direction.

In this embodiment, the seatbelt device 38 installed in the vehicle seat 14 includes the pyrotechnic or electrically operated pretensioner 52 that, when the controller detects or foresees a frontal collision of the vehicle, winds the webbing 40 and retains the shoulder of the occupant located on the outer side in the vehicle width direction by the webbing 40. Thus, in a lateral collision of the vehicle, one half of the body of the occupant P on the outer side in the vehicle width direction is restrained around the shoulder S by the shoulder webbing 40A, while the other half of the body on the center side in the vehicle width direction is restrained by the side airbag 56, so that the motion of the occupant P by inertia due to the collision can be efficiently restricted.

Second Embodiment

Next, a second embodiment of the present disclosure will be described using FIG. 7 to FIG. 9. For configurations and workings that are basically the same as in the first embodiment, the same reference signs as in the first embodiment will be used while the description thereof will be omitted.

This embodiment features an additional chamber 82 that is provided on a surface of a side airbag 80 that is a center side surface in the vehicle width direction in an inflated and deployed state of the side airbag 80. The other configurations are the same as in the far-side airbag device 54 according to the first embodiment.

Figure 7:
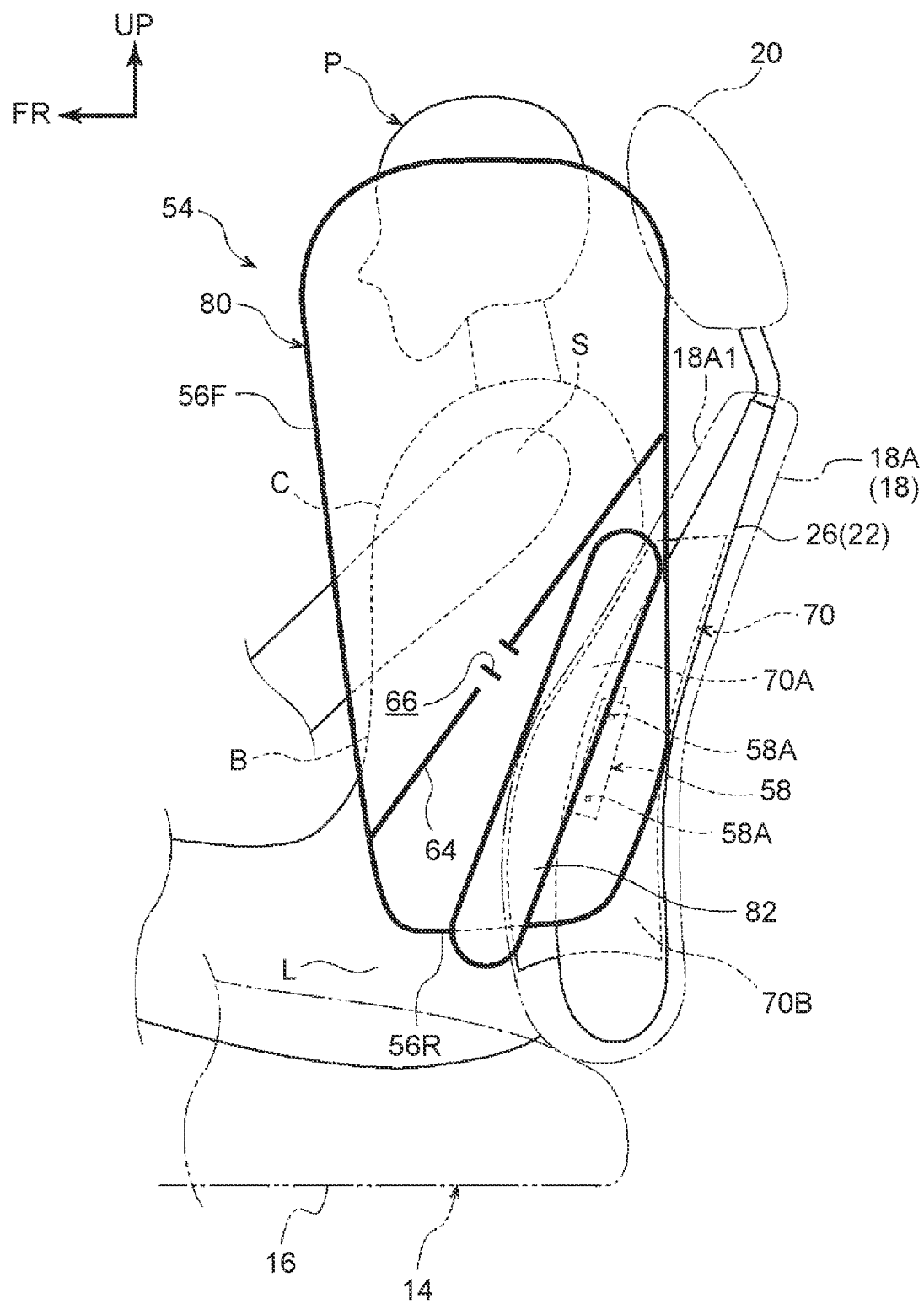
FIG. 7 is a side view corresponding to FIG. 2, showing an inflated and deployed state of a far-side airbag in a vehicle seat equipped with a far-side airbag device according to a second embodiment.
Figure 8:
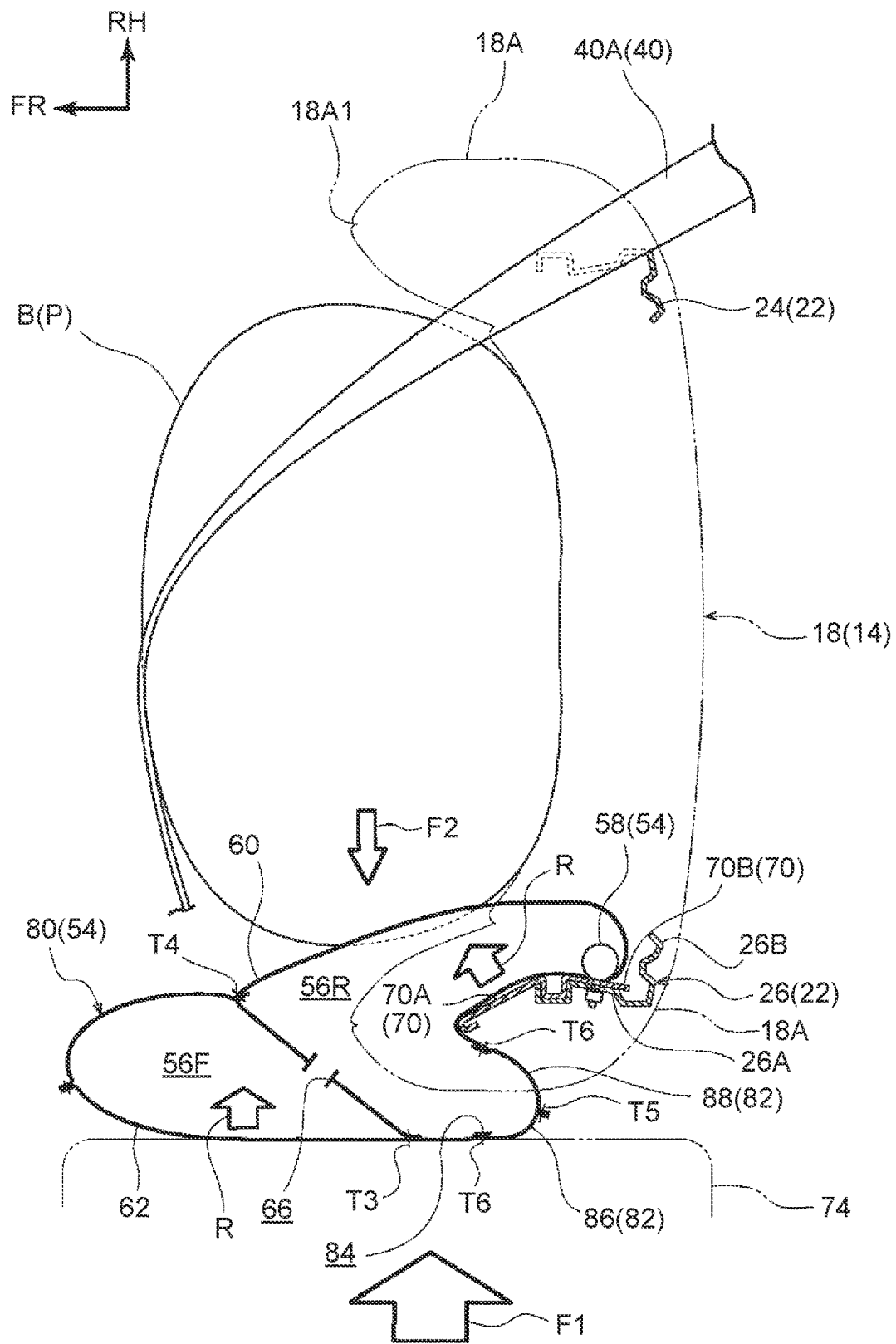
FIG. 8 is a plan view corresponding to FIG. 6, illustrating how the occupant is restrained by the pretensioner and the side airbag.

As shown in FIG. 7 to FIG. 9, in the side airbag 80, a gas introduction opening 84 is formed at a portion of the outer base fabric 62 that constitutes a center portion of the rear chamber 56R. The gas introduction opening 84 has an oval shape with a longitudinal direction thereof oriented in an up-down direction of the side airbag 80, and extends from an upper end to a lower end of a center side surface, in the vehicle width direction, of the rear chamber 56R. The gas introduction opening 84 corresponds to the additional chamber 82 mounted on the outer base fabric 62.

As shown in FIG. 8 and FIG. 9, the additional chamber 82 has a pair of front and rear base fabrics 86, 88 (these reference signs are not shown in FIG. 7) disposed side by side in a front-rear direction of the side airbag 80. The pair of front and rear base fabrics 86, 88 is composed, for example, of the same fabric material as the outer base fabric 62 etc., and has a substantially elongated rectangular shape with a longitudinal direction thereof oriented in the up-down direction of the side airbag 80. Outer peripheral edges of the base fabrics 86, 88 except for end edges 86A, 88A (these reference signs are not shown in the other drawings than FIG. 9) are sewn together along a seam T5, while the end edges 86A, 88A are sewn (coupled) to an edge of the gas introduction opening 84 along a seam T6. The additional chamber 82 is thereby formed in a bag shape with an inside communicating with an inside of the rear chamber 56R, and the rear chamber 56R is thus expanded by the additional chamber 82. While the additional chamber 82 can be regarded as a part of the rear chamber 56R, in this embodiment, the additional chamber 82 and the rear chamber 56R may be distinguished from each other for the convenience of description. The additional chamber 82 is formed so as to have a smaller volume than the rear chamber 56R.

Workings and Effects

Next, the workings and effects of the second embodiment will be described.

In the side airbag 80 configured as described above, when the inflator 58 is activated, gas generated from the inflator 58 is injected (supplied) into the rear chamber 56R through the retainer (not shown). Thus, the rear chamber 56R starts to inflate and deploy toward the vehicle front side. Part of the gas supplied into the rear chamber 56R is supplied into the additional chamber 82 through the gas introduction opening 84. Thus, the additional chamber 82 inflates and deploys toward the center side in the vehicle width direction and the vehicle rear side a little later than the rear chamber 56R.

Here, in this embodiment, the additional chamber 82 having inflated and deployed toward the center side in the vehicle width direction and the vehicle rear side gets caught on the support plate 70 and the pad side part 28B having been torn open toward the center side in the vehicle width direction. Thus, swinging of the front chamber 56F that inflates and deploys after the rear chamber 56R can be reduced. As a result, the additional chamber 82 contributes to stabilizing the deploying behavior of the side airbag 80.

Supplementary Description

In the above embodiments, the support part 70A is provided in the support plate 70 that is provided separately from the inner side frame 26. However, the present disclosure is not limited to this example. The support part may be integrally formed at the front end, in the vehicle front-rear direction, of the inner side frame. Specifically, in this case, the inner side frame includes a main body part corresponding to the inner side frame 26 of the first embodiment, and a support part extending from a front end, in the vehicle front-rear direction, of this main body part toward the seat front side.

In the above embodiments, the support plate 70 (support part 70A) is disposed along the front end of the inner side frame 26, from the upper part to the lower part of the front end. However, the present disclosure is not limited to this example. The support plate 70 (support part 70A) may be disposed at the upper part or the lower part of the front end of the inner side frame 26. Alternatively, the support plate 70 (support part 70A) may be disposed along the front end of the inner side frame 26, from an upper end to a lower end of the front end.

In the above embodiments, the support plate 70 (support part 70A) is formed so as to be longer than the inflator 58 toward both sides in the vehicle up-down direction. However, the present disclosure is not limited to this example. The support plate 70 (support part 70A) may be formed so as to be longer than the inflator 58 toward the vehicle lower side or to be longer than the inflator 58 toward the vehicle upper side.

In the above embodiments, the inflator 58 and the support plate 70 are fastened with the stud bolts 58A at the same time. However, the present disclosure is not limited to this example. The inflator 58 and the support plate 70 may be separately fixed to the inner side frame 26.

What is claimed is:

1. A structure of a seat equipped with a far-side airbag device, the structure comprising:
   a seat back with a side part on a center side in a vehicle width direction;
   an inner side frame that is inside the side part;
   an inflator that is mounted on a vehicle outer side, in the vehicle width direction, of the inner side frame;
   a side airbag that is configured to inflate and deploy toward a vehicle front side when gas is supplied from the inflator, wherein the inflator is housed inside the side airbag; and
   a support part that is at a front end, in a vehicle front-rear direction, of the inner side frame and extends farther toward the vehicle front side than a front end, in the vehicle front-rear direction, of the inner side frame, wherein
   the support part is a front part, in the vehicle front-rear direction, of a support plate having a plate thickness direction oriented in the vehicle width direction;
   the support plate is fixed to a surface of the inner side frame that is on the vehicle outer side of the inner side frame;
   the support plate is secured to a front end, in the vehicle front-rear direction, of the inner side frame;
   the support plate has a fixed part,
   the fixed part has a protrusion protruding toward the center side in the vehicle width direction,
   the protrusion is formed by bending the fixed part into a shape of a groove extending in a vehicle up-down direction,
   the support plate is secured by the protrusion by being engaged in a recessed groove formed in a shape corresponding to the protrusion at the front end of the inner side frame, and
   a rear end of the support plate is fixed to a side wall of the inner side frame with stud bolts passed through a rear end of the fixed part.

2. The structure according to claim 1, wherein, as seen in a plan view, the support part extends from the front end, in the vehicle front-rear direction, of the inner side frame toward the vehicle front side as well as the center side in the vehicle width direction.

3. The structure according to claim 1, wherein the support part is on the vehicle front side of the inflator, and is at least longer than the inflator toward a lower side in the vehicle up-down direction.

4. The structure according to claim 1, wherein an additional chamber that inflates and deploys toward the center side in the vehicle width direction and a vehicle rear side when gas is supplied from the inflator into the additional chamber, is on a center side surface of the side airbag in the vehicle width direction in an inflated and deployed state of the side airbag.

* * * * *